Aug. 21, 1951  V. V. K. SUNDT  2,565,330
POWER CHUCK

Filed Dec. 19, 1946  6 Sheets-Sheet 1

INVENTOR.
Vigo von Krogh Sundt
BY
ATTORNEY.

Aug. 21, 1951  V. V. K. SUNDT  2,565,330
POWER CHUCK
Filed Dec. 19, 1946  6 Sheets-Sheet 2
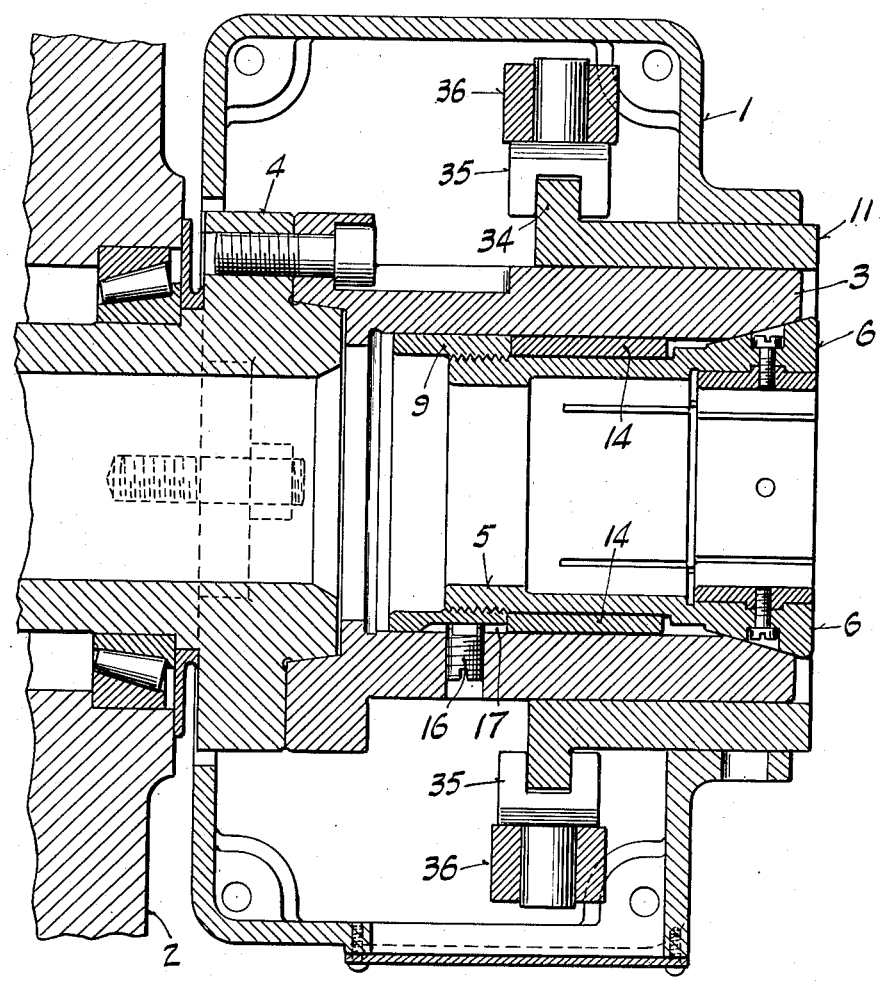
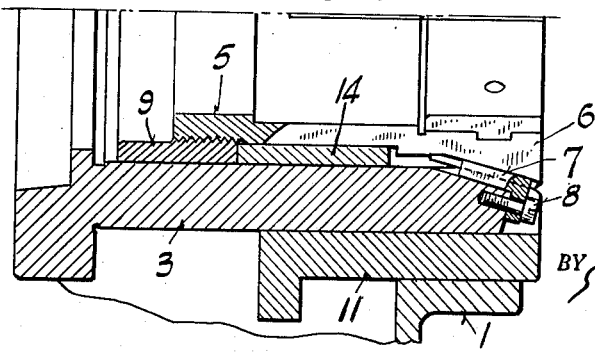
INVENTOR.
Vigo von Krogh Sundt
BY
ATTORNEY.

Aug. 21, 1951 V. V. K. SUNDT 2,565,330
POWER CHUCK
Filed Dec. 19, 1946 6 Sheets-Sheet 3

INVENTOR.
Vigo vonKrogh Sundt
BY
ATTORNEY.

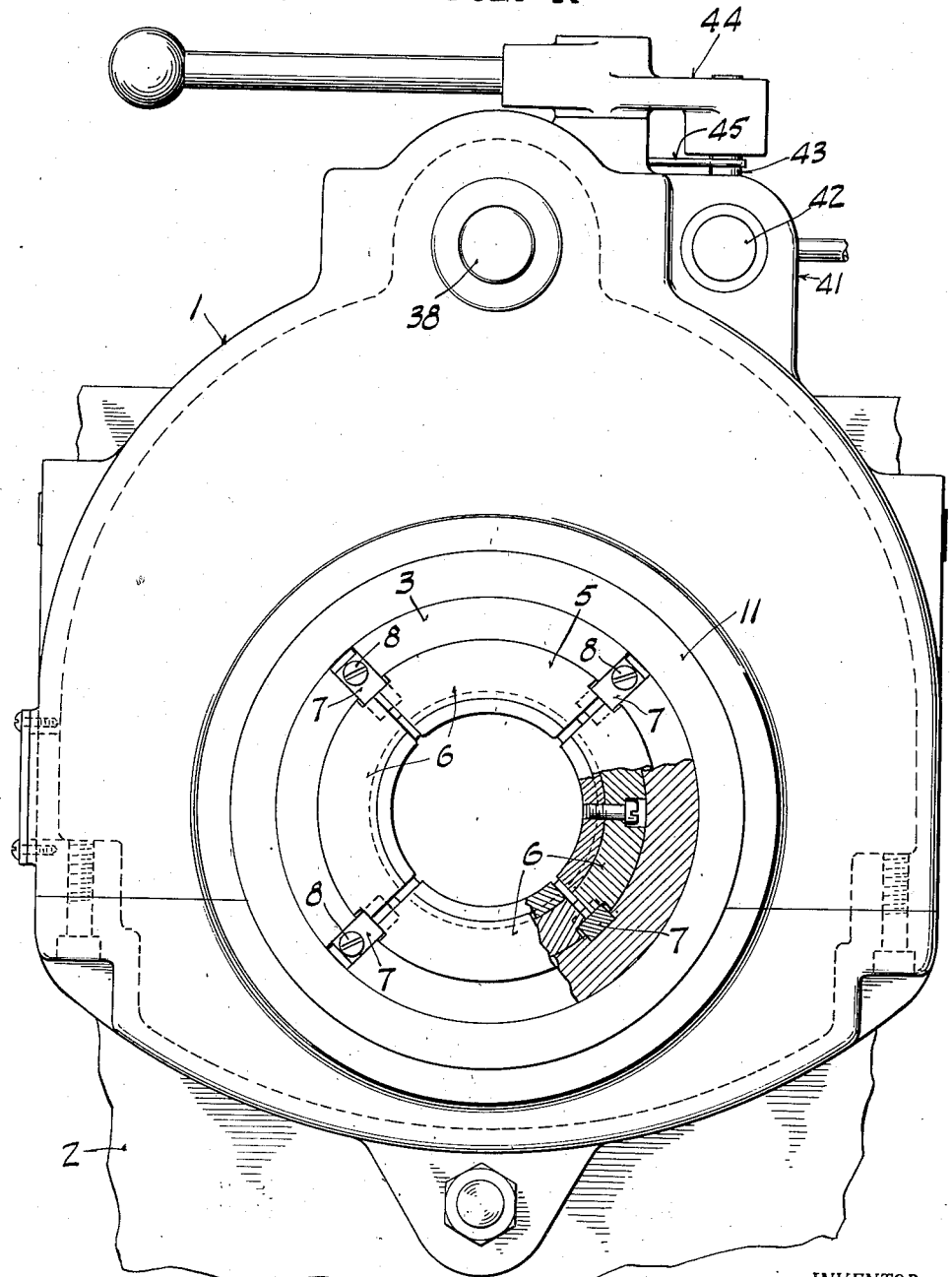

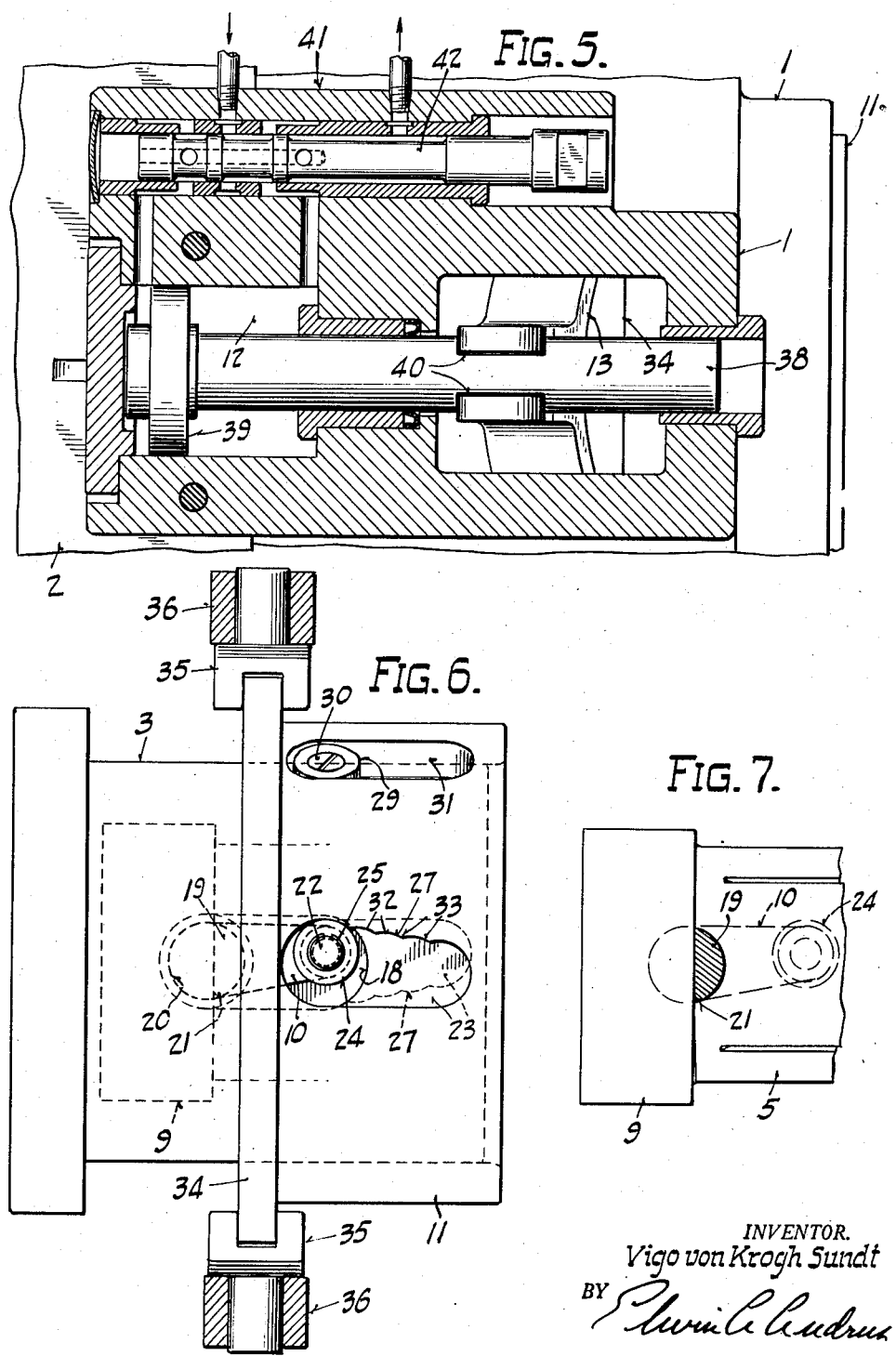

Aug. 21, 1951  V. V. K. SUNDT  2,565,330
POWER CHUCK
Filed Dec. 19, 1946  6 Sheets-Sheet 6
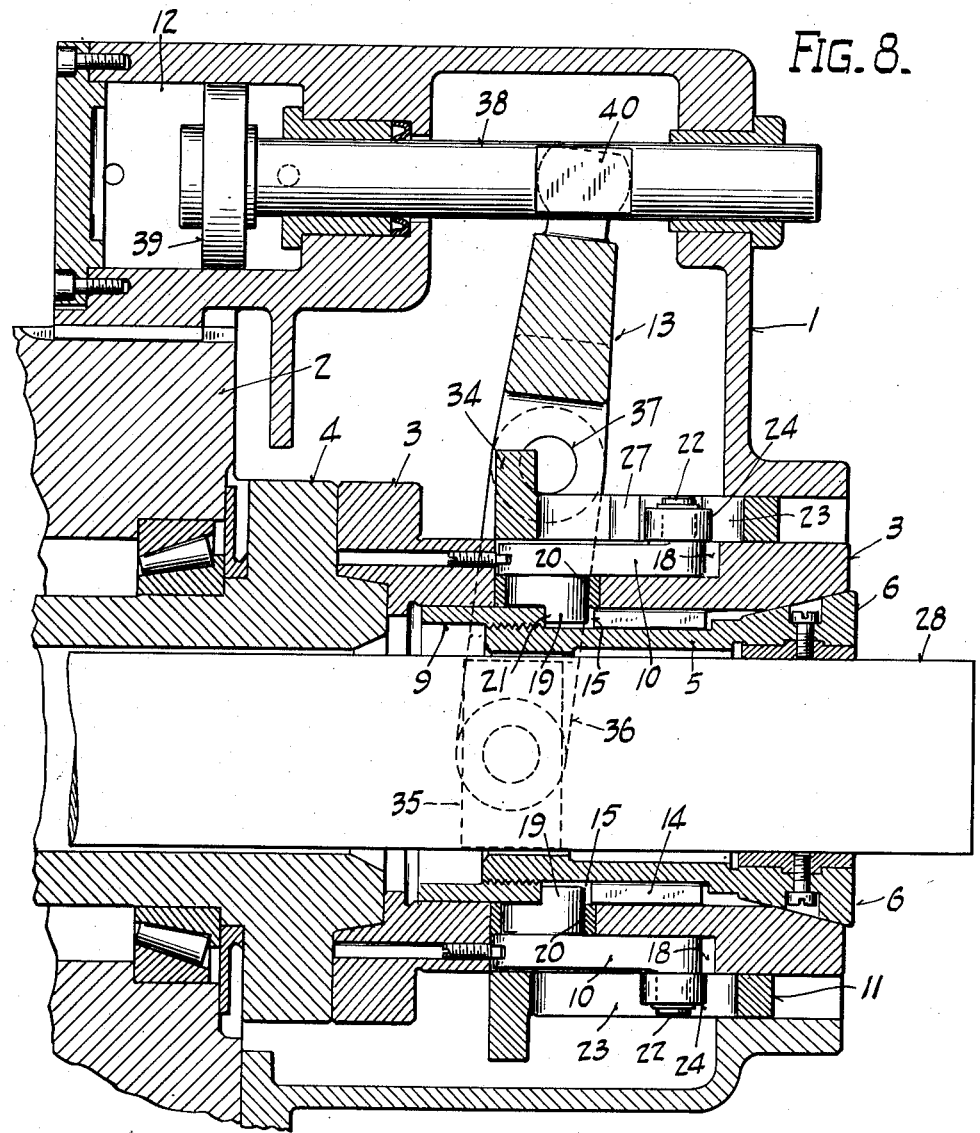
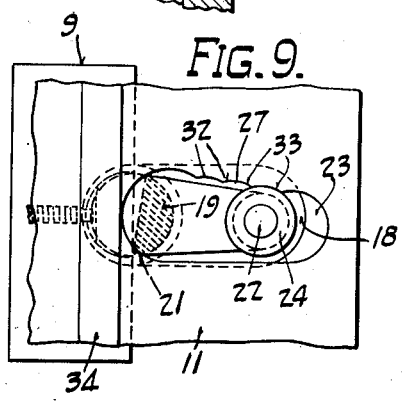
INVENTOR.
Vigo von Krogh Sundt
BY
ATTORNEY.

Patented Aug. 21, 1951

2,565,330

UNITED STATES PATENT OFFICE 2,565,330

POWER CHUCK

Vigo Von Krogh Sundt, Madison, Wis., assignor to Gisholt Machine Company, Madison, Wis., a corporation of Wisconsin Application December 19, 1946, Serial No. 717,212

4 Claims. (Cl. 279—51)

This invention relates to a power chuck and has been embodied in a high speed lathe chuck which may be designed for either hydraulic or air actuation.

One of the principal objects of the invention is to provide a fluid pressure operated collet chuck in which the fluid pressure is applied to move the collet and is substantially relieved of back pressure in operation at predetermined chucking stations.

Another object is to provide a power chuck which will accommodate work of a larger range in size without requiring readjustment.

Another object of the invention is to more readily relieve the operating yoke connections with the rotary chuck from pressure and wear after chucking and during rotation of the spindle and chuck.

Another object is to provide a balanced construction for the rotary parts of the chuck adapting the same for use with high speed lathes and the like.

Another object is to provide a substantially greater leverage and chucking power without increasing the size or number of parts.

Another object is to reduce the mass of the rotary part of the chuck.

Another object is to simplify the chuck structure and actuating parts therefor.

Another object is to provide for use of the full size of the spindle bore by providing an external chuck and eliminating the pull sleeve.

An embodiment of the invention is illustrated in the accompanying drawings in which:

Fig. 2 is a horizontal axial section taken on line 2—2 of Fig. 1;

Fig. 4 is a front elevation of the chuck with parts broken away and sectioned to show the keying of the collets to the body of the chuck;

Fig. 5 is a horizontal axial section taken through the power cylinder and control valve on line 5—5 of Fig. 1;

Fig. 6 is a detail plan view of the slide of the chuck showing the cam and lever construction;

Fig. 7 is a detail section through the base of a lever and the body taken on line 7—7 of Fig. 1;

Fig. 8 is a section corresponding to Fig. 1 and showing the parts operated to chucking position upon a workpiece;

Fig. 9 is a detail view corresponding to Fig. 6 showing the lever in the position of Fig. 8; and Fig. 10 is a detail section showing the key between the jaws and slide.

Figure 1:
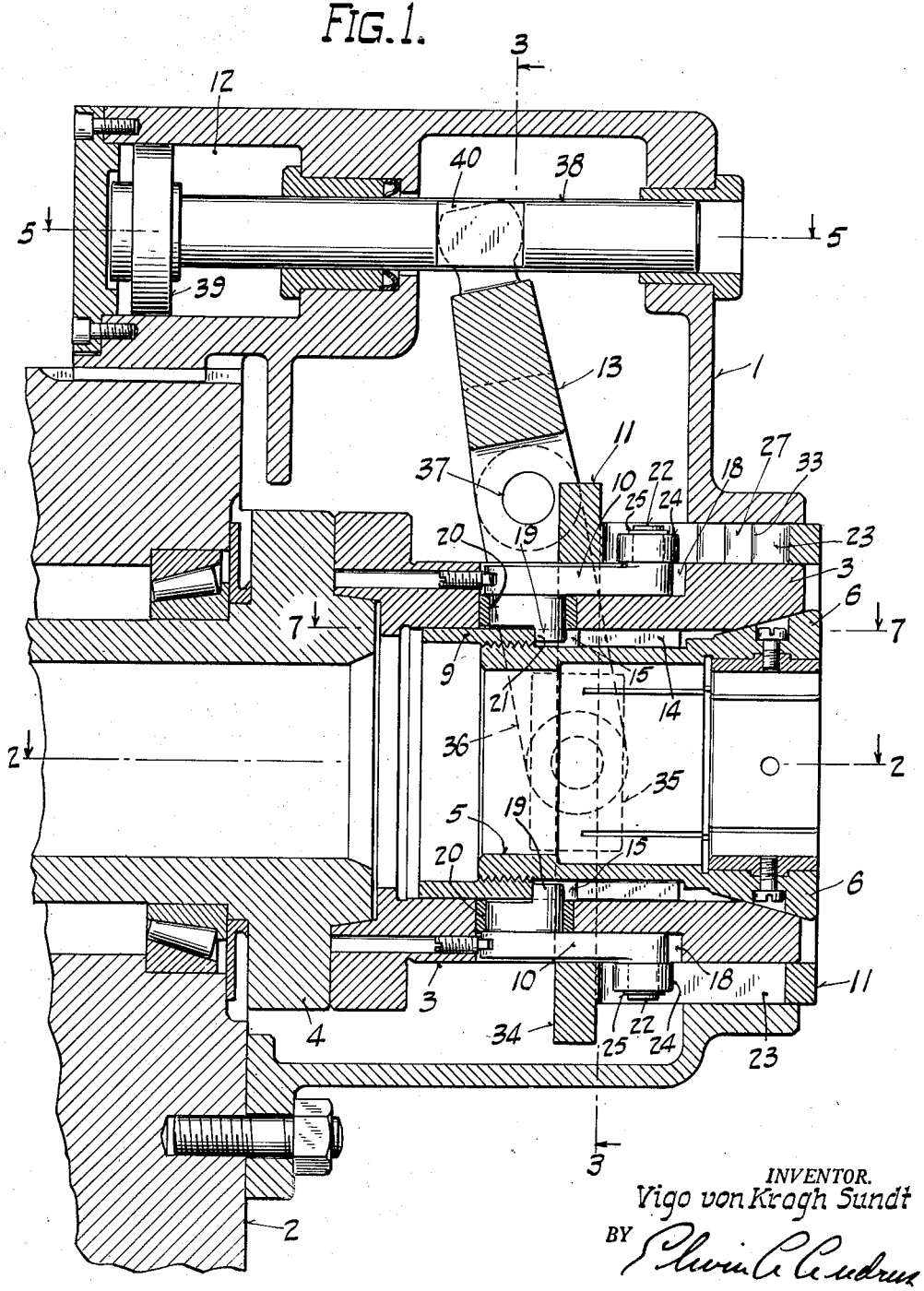
Figure 1 is a vertical axial section through the chuck and the end of the headstock housing and spindle on which it is mounted, and showing the chuck in open position.
Figure 3:
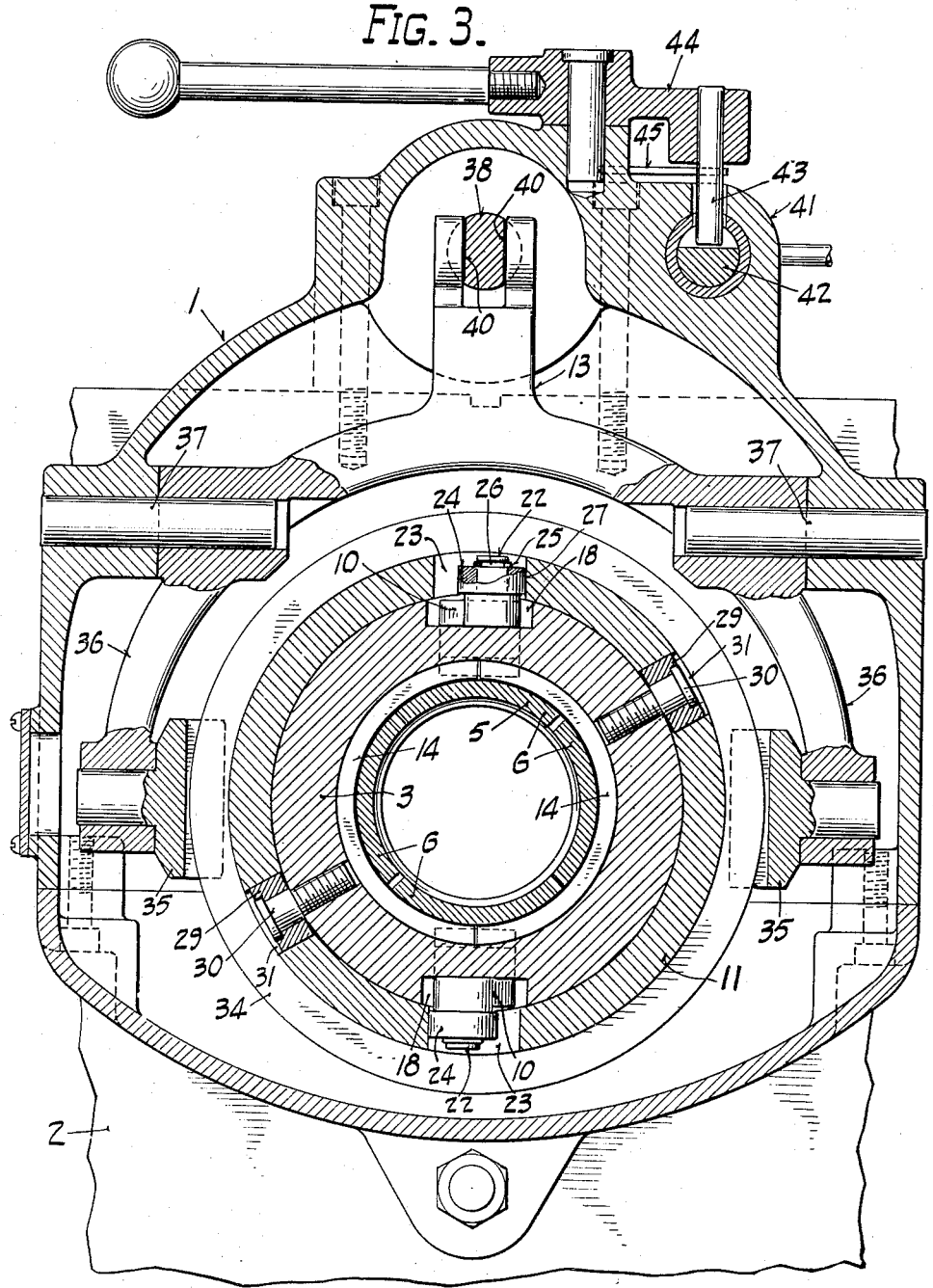
Fig. 3 is a vertical transverse section taken on line 3—3 of Fig. 1 through the centers of the lever arm rollers, and showing the operating yoke.

The chuck comprises, in general, a stationary chuck housing 1 secured to the headstock 2 of a lathe or the like, and a rotary chuck body 3 secured to the operating end of the spindle 4 of the lathe for rotation within the housing 1.

A collet sleeve 5 is disposed for relative longitudinal movement within body 3 and has its forward end split into a plurality of circumferentially spaced collet fingers 6 constituting jaws which are adapted to move radially to grip and release the work under the influence of complementary conical surfaces of the fingers 6 and the body 3 determined by longitudinal movement of collet sleeve 5 within body 3.

The collet fingers 6 are loosely spaced and prevented from distorting due to torque, by means of keys 7 disposed therebetween in recesses in their edges and in corresponding slots in the conical surface of the chuck body 3. Screws 8 secure the keys 7 to the chuck body 3 and prevent displacement of the same.

The collet sleeve 5 is operated by a pusher sleeve 9 to which it is threaded at the rear end of the chuck, and which in turn is operated by a plurality of levers 10 from a slide 11.

A fluid pressure cylinder 12 in housing 1 operates slide 11 by means of a yoke lever 13 or by other suitable means.

The collet sleeve 5 is recessed centrally to receive a split ring 14 disposed between the forward end of pusher sleeve 9 and an abutment in the collet fingers 6. The ring 14 has recesses 15 therein to accommodate the inner ends of the corresponding levers 10 and serves to close the slots between fingers 6 and prevent dirt from passing therethrough to the spaces provided for the levers.

The ring 14 should have a substantial clearance at one end to provide for adjustment of the collet sleeve 5 relative to pusher sleeve 9 by means of the threaded connection therebetween.

The pusher sleeve 9 is prevented from turning relative to body 3 and to collet sleeve 5 to which it is threaded, by means of a stud 16 threaded through body 3 into a keyway 17 in sleeve 9.

The levers 10 extend longitudinally of the chuck in corresponding circumferentially spaced recesses 18 in the outer surface of the chuck body 3.

The inner end of each lever 10 is pivoted in the chuck body 3 by a radially extending circular projection 19 which fits in a bushing 20 in body 3.

The inner end of projection 19 of lever 10 extends into a recess 15 and is substantially semi-circular in cross section with its back side disposed at an angle to advance one edge 21 thereof rearwardly in operative contact with the front edge of pusher sleeve 9 at all times.

The outer end of each lever 10 has a pin 22 extending radially outward therefrom into an opening 23 extending longitudinally of the cylindrical slide 11 which encircles body 3. A roller 24 is mounted on pin 22 and is held thereon by the clip spring 25 encircling pin 22 in a groove 26 therein for the purpose.

The slide 11 is generally cylindrical and rotates with body 3. The slide 11 is disposed to move longitudinally upon body 3 to operate levers 10.

The opening 23 in slide 11 for each lever 10 is of sufficient length longitudinally of the slide to accommodate the roller 24 for the maximum distance of slide movement, and is of a width preferably substantially exceeding the diameter of the roller.

One side of each opening 23 constitutes an operative cam 27 for actuating the corresponding lever 10 by moving roller 24 in a direction generally circumferential of body 3 as it follows the cam in response to longitudinal movements of slide 11.

The cam surface 27 for each opening 23 has a step shape and is disposed generally at an angle to the longitudinal center line of the opening wherein it is closer to the center line at its forward end than at the rear end.

The cam surface 27 faces in a direction to bias lever 10 in a direction tending to hold the rounded edge 21 in contact with pusher sleeve 9.

When slide 11 is moved rearwardly on chuck body 3, the levers 10 are operated by cam surfaces 27 pressing against rollers 24 to cause the corresponding edges 21 to push sleeve 9 rearwardly, thereby pulling collets 6 against the conical inner surface of body 3 and contracting the collets to grip a workpiece 28.

Movement of slide 11 forwardly of chuck body 3 results in a release of the chucking pressures and the workpiece 28 then can be readily removed by a forward pull thereon which releases the collet fingers 6 in body 3.

For the purpose of effecting rotation of slide 11 with body 3, a plurality of roller supports are provided to counteract the pressure of rollers 24 against cam surfaces 27. Each roller support comprises a roller 29 mounted on a pin 30 projecting radially from body 3 in a circumferential line with rollers 24, and each roller 29 rides in a corresponding longitudinal groove 31 in the inner surface of slide 11 where it presses against a wall of the groove in a direction opposite to the direction of pressure of rollers 24 against cam surfaces 27.

In the construction shown there are only two levers 10, disposed diametrically opposite in body 3, and there are two corresponding rollers 29, each disposed near a corresponding lever 10 with the groove 31 adjacent the cam side of the corresponding opening 23. Where more than two levers 10 are employed a corresponding number of rollers 29 should be used. However, by employing only two levers 10 with their corresponding edges 21 disposed diametrically opposite there is less tendency to bind collet sleeve 5 and closer fits may be employed between the collet sleeve 5, the body 3 and the side 11.

The steps 32 of cam surfaces 27 are scalloplike and constitute alternate short increments in length of cam step approaches 33 disposed at an angle to the longitudinal center line of the corresponding opening 23, and intermediate step increments of length extending parallel to the longitudinal center line of the opening 23 and to the axis of the chuck.

When a roller 24 rides along the inclined step approaches upon rearward movement of slide 11, the corresponding lever 10 pushes sleeve 9 rearwardly to tighten the collets 6 upon the workpiece 28. Upon reaching the desired chucking pressures, the roller 24 rests upon a step 32 which is non-inclined and which merely serves to hold lever 10 in position to maintain the chuck tightly closed upon the work. The slide 11 will not tend to move in either direction by reason of the chucking forces.

The number of wedge steps 32 employed may depend upon the size of roller 24 and the length of cam surface 27 required by the movement of slide 11. In the construction illustrated four steps 32 in addition to the release position for roller 24 were found to be adequate and to provide a desirable range to accommodate ordinary work tolerances.

The operation of slide 11 by yoke lever 13 and cylinder 12 is accomplished by a flange 34 on slide 11 and which is embraced by shoes 35 at the lower ends of the opposite arms 36 of the yoke lever.

The lever 13 is pivoted at 37 in the housing 1, and its upper end is bifurcated to embrace a reciprocating rod 38 which constitutes a piston rod for piston 39 in cylinder 12. The bifurcated upper end of lever 13 has its members disposed in recesses 40 on each side of rod 38 and curved to maintain contact with the walls of the corresponding recesses in a horizontal line in the plane of the center line of rod 38.

Reciprocation of rod 38 forwardly by fluid pressure in the rear end of cylinder 12 acting against the full face of the rear side of piston 39 pushes lever 13 forwardly pivoting the same to move shoes 35 and slide 11 rearwardly to operate the chuck and grip workpiece 28.

Reciprocation of rod 38 rearwardly by fluid pressure in the forward end of cylinder 12 acting against the front side of piston 39 pulls lever 13 rearwardly pivoting the same to move shoes 35 and slide 11 forwardly to release the levers 10 and permit release of the work 28 by collet fingers 6.

The operation of piston 39 is controlled by a manually operable slide valve 41 which controls the entrance of pressure fluid to cylinder 12 and the exhaust of fluid therefrom.

Valve 41 is disposed in housing 1 alongside of cylinder 12 at the top of the housing, the cylinder being generally parallel to the axis of the chuck.

The valve 41 may be constructed in any suitable manner to provide the desired control for piston 39 by admitting pressure fluid selectively to the opposite ends of cylinder 12 and simultaneously exhausting fluid from the other end, and by providing a neutral position in which the fluid in the opposite ends of the cylinder is equalized in pressure as by connecting both ends simultaneously to drain.

The slide 42 in valve 41 is operated by a pin 43 carried by the short arm of pivoted lever 44 on top of housing 1.

The manual operating lever 44 should be biased to a normal neutral position by spring detents 45 or the like so that it does not retain the operating stress upon the parts after the chuck is operated to gripping or release position.

The chuck of the present invention is adapted for high chucking pressures and for high speed lathes where a balanced rotary structure is desired. All rotary parts are balanced in the chuck and there is no distortion created by any lack of balance.

By employing the wedge step cams for operating the levers 10, a very effective means is provided for avoiding back pressure upon the shoes 35 and lever 13. The wedge step cams also serve to provide for chucking of work which may vary in diameter due to tolerances in manufacture.

Where work of different diameter is to be chucked, the chuck may be adjusted by removing keys 7 and turning collet sleeve 5 a quarter turn or more in the desired direction, either in or out, and then replacing keys 7.

The collet sleeve 5 may be of substantially the same inside diameter as the spindle bore of the lathe so that the chuck will take stock of a diameter substantially as great as that which will pass through the spindle.

The chuck illustrated provides for contraction of the collet fingers 6 upon rearward pull of the collet sleeve 5. If desired, it is possible to reverse the action by reversing the inclined surfaces of the fingers and body, to thereby provide for contraction of collet fingers 6 upon a forward push of sleeve 5, as where it is desired to abut the work against a center or the like.

The invention may have various embodiments within the scope of the accompanying claims.

I claim:

1. A power chuck for high speed lathes and the like, comprising a rotary cylindrical chuck body, a collet sleeve mounted for relative longitudinal movement therein and for rotation therewith, said collet sleeve being split at one end to provide a series of circumferentially spaced collet fingers operable radially by complemental inclined surfaces between the fingers and the chuck body in response to longitudinal movement of the collet sleeve, a plurality of operating levers fulcrumed in said body with outwardly extending crank pins for operating the same and having their inward short arms engaging corresponding abutments on the collet sleeve to move the latter longitudinally of the body, a slide member encircling said body and rotatable therewith, said slide member having a plurality of longitudinally extending recesses therein for receiving the operating crank pins of the corresponding levers, one side of each recess constituting a cam disposed to engage the crank pin and operate the outer long arm of the corresponding lever in response to longitudinal movement of the slide in at least one direction, each cam having steps therein providing a series of alternate inclined and non-inclined increments relative to the corresponding lever to prevent back pressure from the chuck on the operating mechanism, and means to operate said slide member to effect operation of the chuck.

2. A power chuck for high speed lathes and the like, comprising a rotary cylindrical chuck body, a collet sleeve mounted for relative longitudinal movement therein and for rotation therewith, said collet sleeve being split at one end to provide a series of circumferentially spaced collet fingers operable radially by complemental inclined surfaces between the fingers and the chuck body in response to longitudinal movement of the collet sleeve, a plurality of operating levers fulcrumed in said body with outwardly extending crank pins for operating the same and having their inward short arms engaging corresponding abutments on the collet sleeve to move the latter longitudinally of the body, a slide member encircling said body and rotatable therewith, said slide member having a plurality of longitudinally extending recesses therein for receiving the operating crank pins of the corresponding levers, one side of each recess constituting a cam disposed to engage the crank pin and operate the outer long arms of the corresponding levers in response to longitudinal movement of the slide in at least one direction, each cam having steps therein providing a series of alternate inclined and non-inclined increments relative to the corresponding lever to prevent back pressure from the chuck on the operating mechanism, and power mechanism for operating said slide selectively in opposite directions, said mechanism having a normal neutral position at all times except when moving said slide.

3. A power chuck for high speed lathes and the like, comprising a rotary cylindrical chuck body with a plurality of collet fingers therein, a collet operating ring, a plurality of levers fulcrumed in said chuck body to pivot about axes lying substantially radially of said chuck to operate said ring, a slide encircling said body and disposed to rotate therewith, said slide having longitudinally inclined cam surfaces having a series of spaced increments disposed parallel to the axis of the chuck and separated by step cam surfaces, means to move said slide longitudinally of the chuck body whereby the cam surfaces of said slide effect pivotal movement of corresponding levers in a direction substantially circumferential of the chuck to operate said ring and collet, the spaced increment and step cam surface of said ring serving to retain the ring in a selected longitudinal chucking position, and the radial disposition of the lever axes causing any back pressure from said collet and levers to be exerted upon said slide only in a circumferential direction corresponding to its direction of rotation.

4. A power chuck for high speed lathes and the like, comprising a rotary cylindrical chuck body with a plurality of collet fingers, a collet operating ring, a plurality of levers fulcrumed in said body to operate said ring and having rollers mounted on their arms opposite the ring, a slide encircling said body and disposed to rotate therewith, said slide having a longitudinally inclined series of cam surfaces, each of the cam surfaces being of arcuate shape substantially complement the curvature of said rollers and being separated by step cam surfaces, means to move said slide longitudinally of the chuck body whereby the cam surfaces of said slide effect pivotal movement of said levers, the arcuate and stepped surfaces of said ring serving to retain the rollers and ring in a selected longitudinal chucking position.

VIGO VON KROGH SUNDT.

REFERENCES CITED

The following references are of record in the file of this patent:

UNITED STATES PATENTS

| Number | Name | Date |
|---|---|---|
| 442,230 | Libby | Dec. 9, 1890 |
| 487,245 | Briggs | Dec. 6, 1892 |
| 594,077 | Gauthier | Nov. 23, 1897 |
| 685,063 | Allen | Nov. 5, 1901 |
| 952,149 | Smith et al. | Mar. 15, 1910 |
| 1,818,305 | Class | Aug. 11, 1931 |
| 1,864,786 | Wilkins | June 28, 1932 |
| 2,159,162 | Johnson | May 23, 1939 |
| 2,360,908 | Stoner | Oct. 24, 1944 |
| 2,410,807 | Brennen | Nov. 12, 1946 |
| 2,454,098 | Schmidt | Nov. 16, 1948 |
| 2,466,651 | Zagar | Apr. 5, 1949 |